United States Patent [19]

Kawamura

[11] Patent Number: 5,702,173
[45] Date of Patent: Dec. 30, 1997

[54] VEHICULAR LAMP HAVING SIMPLIFIED STRUCTURE AND REDUCED CONDENSATION

[75] Inventor: Naoshi Kawamura, Shizuoka, Japan

[73] Assignee: Koito Manufacturing Co., Ltd., Tokyo, Japan

[21] Appl. No.: 399,637

[22] Filed: Mar. 7, 1995

[30] Foreign Application Priority Data

Mar. 9, 1994 [JP] Japan .................................. 6-064411

[51] Int. Cl.$^6$ .................................................. B60Q 1/04
[52] U.S. Cl. ..................... 362/80; 362/61; 362/346; 362/243; 362/247
[58] Field of Search ..................... 362/61, 346, 240, 362/255, 297, 327, 241, 249, 247, 80, 243

[56] References Cited

U.S. PATENT DOCUMENTS

| | | | |
|---|---|---|---|
| 4,831,502 | 5/1989 | Fujino et al. | 362/346 |
| 4,839,785 | 6/1989 | Ohishi | 362/61 |
| 4,895,693 | 1/1990 | Suzuki et al. | 362/61 |
| 5,172,972 | 12/1992 | Terao | 362/61 |
| 5,199,779 | 4/1993 | Sato | 362/61 |
| 5,353,204 | 10/1994 | Kawamura | 362/240 |
| 5,394,310 | 2/1995 | Iwasaki | 362/346 |

*Primary Examiner*—Thomas M. Sember
*Attorney, Agent, or Firm*—Sughrue, Mion, Zinn, Macpeak & Seas, PLLC

[57] ABSTRACT

A vehicular lamp having a combination lamp structure in which the reflectors for a plural number of lamps and an extension reflector are provided in a lamp body, wherein a reflector for at least one lamp of the plural number of lamps and an extension reflector are constructed as a single body. Of the reflectors for the lamps, the reflector fixedly mounted on the lamp body and the extension reflector are preferably constructed as a single body. A specific reflecting portion for reflecting light from a bulb toward a lens area located apart from the bulbs of the lamps is formed as a part of the reflector. For example, a lamp of which the lens is partly extended to the side of a vehicle body, and a specific reflecting portion for reflecting light from the bulb toward a lens area of the lens extending to the side of the vehicle body is formed as a part of the reflector of the lamp.

5 Claims, 10 Drawing Sheets

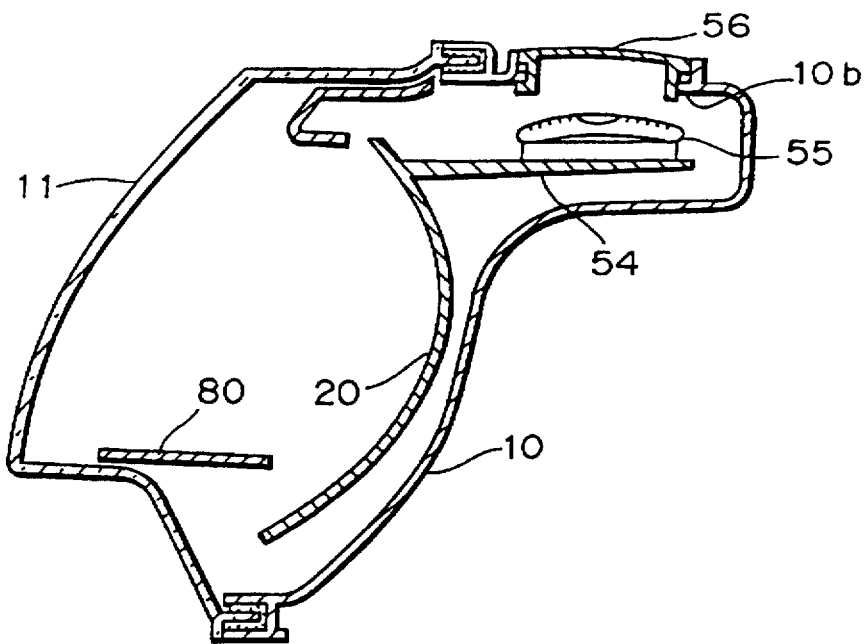
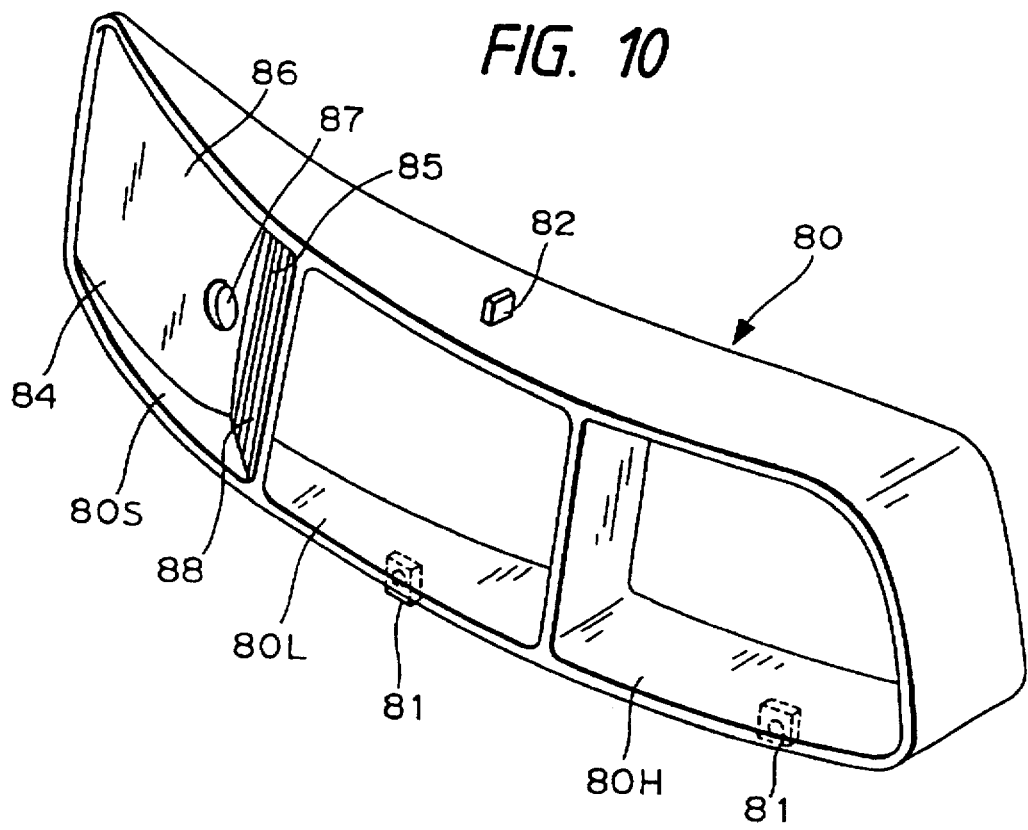

VEHICULAR LAMP HAVING SIMPLIFIED STRUCTURE AND REDUCED CONDENSATION

BACKGROUND OF THE INVENTION

The present invention relates to a vehicular lamp with a reflector for obtaining a predetermined distribution of light, such as a headlamp for motor vehicles.

A combination lamp composed of a plural number of lamps combined into a single unit has been known. In the construction of a combination lamp, a plural number of bulbs are disposed within a lamp chamber constructed with a single lamp body and a lens. Reflectors for forwardly projecting light beams emitted from the individual bulbs with predetermined light distributions are provided for respective ones of the bulbs.

In a lamp device, such as a headlamp, where it is required to adjust the light distribution characteristics of the light beams reflected by the reflectors, each reflector is provided with an aiming mechanism. The reflector is vertically and horizontally tilted by the aiming mechanism so as to obtain the desired light distribution characteristics.

A lamp with an aiming mechanism must be constructed so as to allow the reflector to be tiltable vertically and horizontally within the lamp body. Therefore, the reflector and the lamp body must be constructed separately. In general, the reflector must be smaller than the lamp body since the reflector is tiltable within the lamp body. Accordingly, a gap is inevitably formed between the reflector and the lamp body. The presence of this gap detracts from the outward appearance of the lamp.

Generally, the reflector is made of resin, for example. The surface of the reflector is coated with a metallic material, such as aluminum, by coating or a vapor deposition process, thereby forming the reflecting surface. Black resin is often used to mold the lamp body. The resin is exposed on the surface of the lamp body since there is no need of a reflecting function for the lamp body. When the thus-constructed conventional lamp is observed from its front side through the lens, the black surface of the lamp body is viewable through the gap between the reflector and the lamp body. This black surface is seen as a black part of the lamp, causing the lamp to have a rather poor appearance.

To cope with this problem, the conventional practice has been to provide an extension reflector for concealing the gap between the reflector and the lamp body from the outside of the lamp. FIG. 12 is a cross-sectional view showing a headlamp with an extension reflector. The headlamp is a combination lamp consisting of a high beam lamp HL, a low beam lamp LL, and a side marker lamp (clearance lamp) SL, which are combined into a single unit. Reflectors 102, 103 and 104 for those lamps are installed within a single lamp body 101. Sockets 105, 106 and 107 are mounted on the reflectors 102, 103 and 104, respectively. Bulbs 108, 109 and 110 are supported by the respective reflectors. A lens 111 made of transparent resin is mounted on the front opening of the lamp body 101. When the reflectors, particularly the reflectors 102 and 103 of the high beam lamp HL and the low beam lamp LL, are moved, a black part of the lamp body 101 is exposed outside through the peripheries of the reflectors 102 and 103, and the lens 111. To prevent the exposure of the black part, an extension reflector 112 is provided so as to cover these gaps. Like the reflector, the extension reflector 112, made of resin, is coated with a metallic material, such as aluminum, by coating or vapor deposition process. The extension reflector 112 is fastened to the lens 111 and the lamp body 101, for example, by means of fixing screws (not shown).

The extension reflector 112 has an additional function of limiting the passing beam area to the area within the front side of the lens by preventing light from leaking through the upper and lower sides of the lens 111.

To construct this combination lamp by combining the respective lamps into a single unit, the reflectors are installed within the lamp body, and the extension reflectors are provided for the respective lamps. Thus, reflectors and extension reflectors, which are equal in number to the number of lamps, are used. In other words, the number of necessary component parts of the lamp is high.

To solve this problem, it has been proposed to mold the extension reflectors for the lamps as a single extension reflector. Since only one extension reflector is used in this proposal, the number of required component parts of the lamp is correspondingly reduced. However, in a combination lamp using three lamps as shown in FIG. 12, or in a combination lamp using more than three lamps, the number of reflectors is increased as the number of lamps is increased. Further, the extension reflector is additionally required. For this reason, the still a relatively large number of parts is required.

In the combination lamp described above, the reflector for the side marker lamp is fixed, while the reflectors for the remaining beam lamps are tiltable for aiming adjustment. Therefore, the reflectors for the lamps and the extension reflector must separately be assembled into the lamp body, thus requiring complicated assembly work. The coating or vapor deposition process for forming the reflecting surfaces must be applied to the reflectors and the extension reflector. The reflecting surface forming process is increased in complexity in proportion to the number of the component parts. This results in complexity of the manufacturing process of the lamp device.

In the lamp device having a part extending to the side of the automobile body, that is, in a lamp device with a curved part such as the side marker lamp, the lens area of the curved part is located farther from the bulb than the remaining lens area. Accordingly, the amount of light on the lens area of the curved part is correspondingly reduced. Moreover, the temperature rise in this lens area is smaller than in remaining lens areas. As a result, in the lens area of the curved part with the lamp body, the air in contact with the lens surface tends to cool so as to easily condense. Such condensation remarkably reduces the amount of light passing the lens area, or deteriorates the outward appearance of the of the lamp device due to the presence of water droplets adhering to the lens surface.

The condensation phenomenon is particularly distinguished in a combination lamp including a side marker lamp. The reason for this is that in this type of combination lamp the central area of the lens is more strongly heated by the light emitted from the plural number of bulbs than the remaining lens area. Accordingly, the difference in temperature between the central area of the lens and the curved part is great, so that condensation tends to occur.

SUMMARY OF THE INVENTION

Accordingly, an object of the present invention is to provide a combination-type vehicular lamp with reflectors and extension reflectors having a reduced number of component parts, to thereby simplify the construction of the combination lamp.

Another object of the present invention is to provide a vehicular lamp for which the work required to assembly the reflectors and the extension reflector into the lamp body is reduced, and the process of manufacturing the reflectors and the extension reflector is simplified.

An additional object of the present invention is to provide a vehicular lamp is which the temperature drop is reduced in the lens area where the amount of light passing therethrough is small, to thereby eliminate condensation on the lens surface.

To achieve the above object, there is provided a vehicular lamp of a combination lamp structure in which the reflectors for a plural number of lamps and an extension reflector are provided in a lamp body, improved in that a reflector for at least one lamp of the plural number of lamps and an extension reflector are constructed as a single body.

In the present invention, of the reflectors for the lamps, the reflector fixedly mounted on the lamp body and the extension reflector are constructed as a single body.

In the vehicular lamp, a reflecting portion for reflecting light beams from a bulb toward a lens area located apart from the bulbs of the lamps is formed as a part of the reflector.

For example, a lamp in which the lens is partly extended to the side of the automobile body and a reflecting portion for reflecting light beams from the bulb toward a lens area of the lens extending to the side of the car body is formed as a part of the reflector of the lamp.

In the present invention, the reflector firmly mounted on the lamp body and the extension reflector are constructed with a single body. The reflector may be considered as a single component with the extension reflector. This leads to a reduction in the number of component parts and the number of manufacturing steps.

Further, the reflector and the extension reflector are concurrently manufactured as a single body. This feature also leads to a reduction of the number of manufacturing steps.

In the invention, a reflecting portion reflects additional light to the lens area which receives a lesser amount of light, thereby eliminating condensation in the specific lens area.

BRIEF DESCRIPTION OF THE DRAWINGS

Other objects, features, and advantages of the present invention will be apparent when carefully reading the following detailed description in connection with the accompanying drawings, in which:

FIG. 8 is an enlarged cross-sectional view taken on line D—D in FIG. 1;

FIG. 10 is a perspective view showing an extension reflector;

DESCRIPTION OF THE PREFERRED EMBODIMENTS

Figure 1:
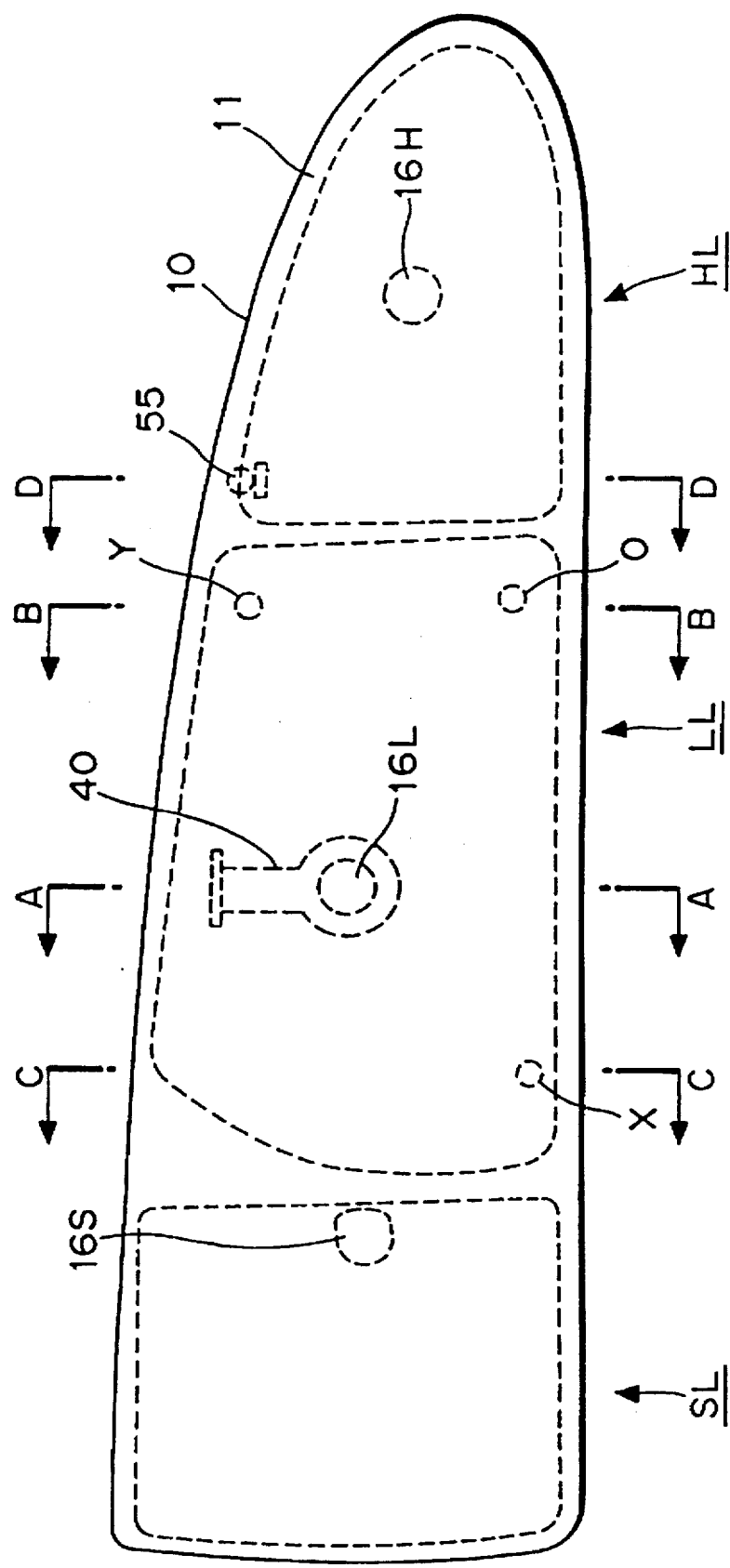
FIG. 1 is a front view showing an embodiment of the present invention in the form of a combination headlamp for motor vehicles.
Figure 2:
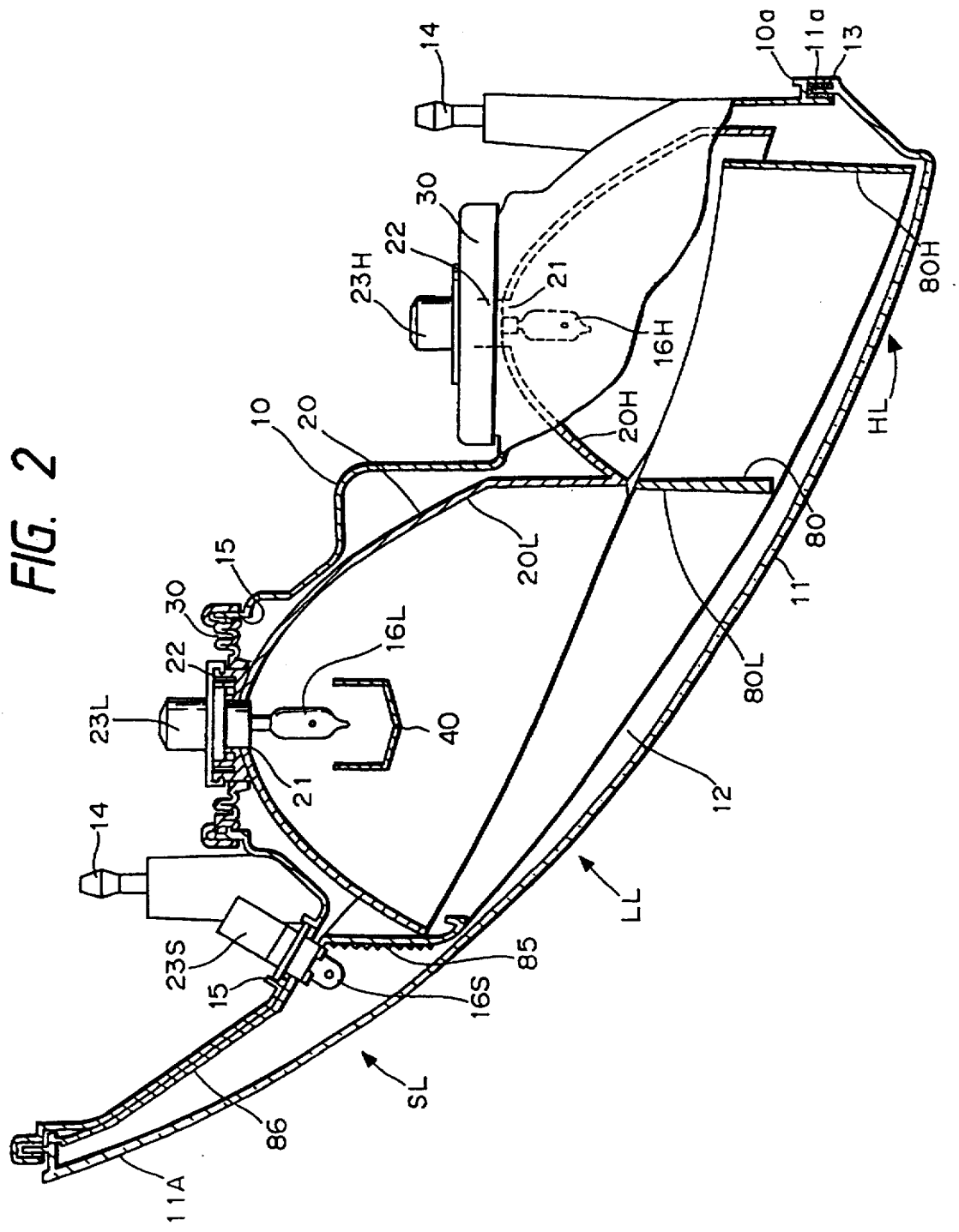
FIG. 2 is a horizontal sectional view of the combination headlamp of FIG. 1.

Preferred embodiments of the present invention will be described with reference to the accompanying drawings. FIG. 1 is a front view showing an embodiment of the present invention in the form of a combination headlamp for motor vehicles. FIG. 2 is a horizontal sectional view of the combination headlamp of FIG. 1.

A lamp body 10, made of black resin, is horizontally elongated in shape. A lens 11, made of transparent resin, is mounted on the front opening of the lamp body 10. The lens 11 and the lamp body 10 define a lamp chamber 12. A seal leg 11a, integral with the lens 11, protrudes rearward from the peripheral edge of the lens 11. The seal leg 11a is inserted into a seal groove 10a of the peripheral edge of the lamp body 10, and hermetically fastened thereto by sealer 13, such as hot melt. A plural number of stud pins 14 are erected on the rear side of the lamp body 10. These stud pins 14 are used for mounting the lamp device on an automobile body (not shown).

The lamp chamber 12 in the lamp body 10 is divided into three lamp sections, arrayed horizontally. In the present embodiment, in FIG. 1, the right lamp section is for a high beam lamp (running lamp) HL, the middle lamp section is for a low beam lamp (passing lamp) LL, and the left lamp section is for a side marker lamp (clearance lamp) SL. In the rear side of the lamp body 10, bulb insertion holes 15 of a relatively large diameter are formed at locations corresponding to the high beam lamp HL and the low beam lamp LL, and a bulb insertion hole 15 of a relatively small diameter is formed at a location corresponding to the side marker lamp SL. As will be described later, bulbs 16H, 16L and 16S are inserted into respective ones of the bulb insertion holes 15, and are supported in the lamp sections of the lamp chamber.

Within the lamp chamber 12, a reflector 20 is disposed extending from the high beam lamp HL to the low beam lamp LL. The bulbs 16H and 16L for the high beam lamp and the low beam lamp are held by the reflector 20. The reflector 20, formed by molding, includes reflecting surface portions 20H and 20L, each shaped as a hyperboloid of revolution, which are arrayed side by side and at locations corresponding to the high beam lamp HL and the low beam lamp LL. The front sides of the reflecting surface portions 20H and 20L are coated with aluminum by coating or a vapor deposition process to thereby form reflecting surfaces. A socket insertion hole 21 is formed at the top of the rear side of each of the reflecting surface portions 20H and 20L. A cylindrical socket mounting portion 22 of each reflecting surface portion is located around the socket insertion hole 21.

Figure 3:
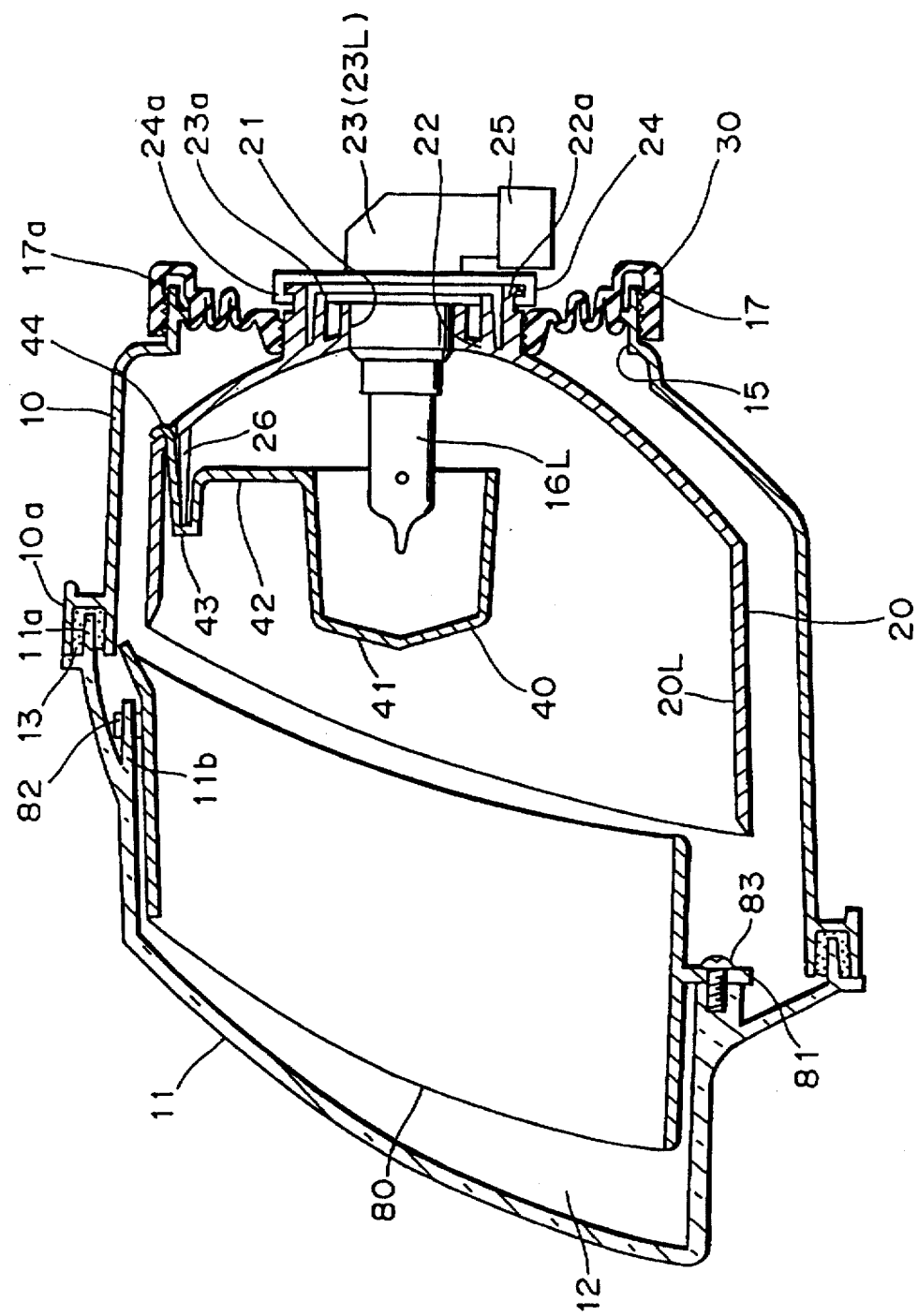
FIG. 3 is an enlarged cross-sectional view taken on line A—A in FIG. 1.

FIG. 3 is an enlarged cross-sectional view taken on line A—A in FIG. 1. As shown in FIG. 3, a bulb socket 23 (23H, 23L) is inserted into the socket insertion hole 21 and fixed to the socket mounting portion 22. The bulb 16L is held by the bulb socket 23 within the reflecting surface portion 20L (20H). The bulb socket 23 is provided with a circular flange 23a. The circular flange 23a contacts the rear side of the socket mounting portion 22. Further, a fixing ring 24 is fitted to the socket mounting portion 22 while being applied to the circular flange 23a. That is, the bulb socket 23 is fastened to the reflector 20 in a state such that the circular flange 23a is held between the socket mounting portion 22 and the fixing ring 24. In this embodiment, the fixing ring 24 has lance-like engaging parts 24a formed at plural positions thereof. Collars 22a, equal in number to the lance-like engaging parts 24a, are formed on the circumferential edge of the socket mounting portion 22. The bulb socket 23 is attached to and removed from the socket mounting portion 22 by engaging the lance-like engaging parts 24a with the collars 22a and disengaging the lance-like engaging parts 24a from the collars 22a. The rear part of the bulb socket 23 is bent substantially rectangularly to form a connector 25 containing electrodes. A connector extending to an electric cord (not shown) is applied to the connector 25 to thereby supply electric power to the bulb 16L.

Figure 4:
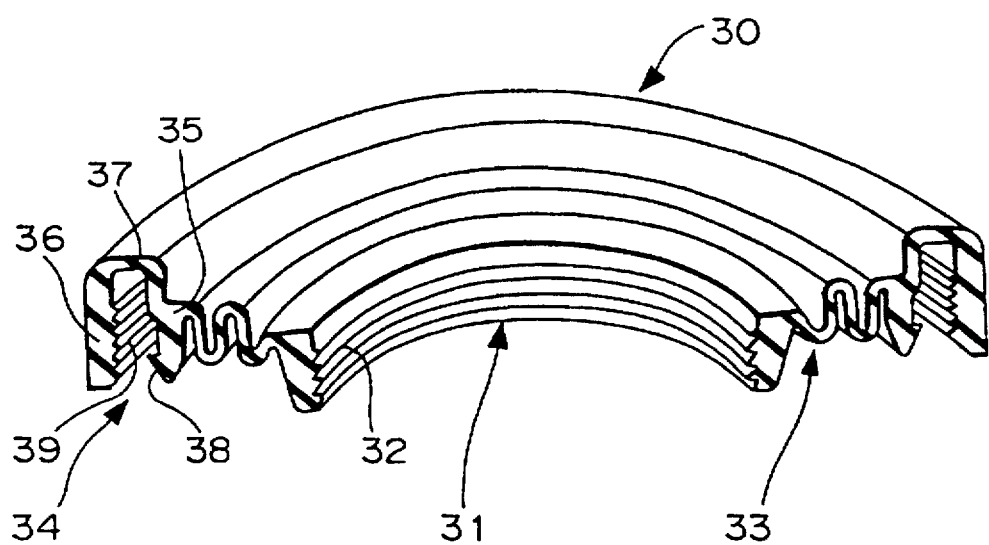
FIG. 4 is a perspective view showing a part of a waterproof cover.

A waterproof cover 30 made of ring-plate-like rubber or resin is used for closing a ring-like gap between the circumferential surface of the socket mounting portion 22 and the bulb insertion hole 15 of the lamp body 10. FIG. 4 is a perspective view showing a part of the waterproof cover 30. An inner portion 31 of the waterproof cover 30 is a thick cylindrical part of which the inner diameter is substantially equal to the outer diameter of the socket mounting portion 22. A plural number of ring-like grooves 32, arrayed in the axial direction, are formed in the inner surface of the inner portion 31. With the provision of the ring-like grooves 32, the inner portion 31 resiliently contacts the circumferential surface of the socket mounting portion 22. A middle portion 33 has a wavy shape in cross section. Due to the wavy shape of the middle portion 33, the waterproof cover 30 is resilient in its thickness direction and in its diameter direction.

An outer portion 34, shaped like a U in cross section, of the waterproof cover 30 consists of an inner part 35 and an outer part 36, both being thick. The inner and outer parts 35 and 36 are connected by a thin connection part 37. A lance is formed over the entire top edge of the outer surface of the inner part 35. The lance-shaped top edge serves as an engaging part 38. A plural number of ring-like grooves 39, arrayed in the axial direction, are formed in the inner surface of the outer part 36.

The outer portion 34 of the waterproof cover 30 is resiliently fitted to a ring-like upright wall 17 provided at the circumferential edge of the bulb insertion hole 15 of the lamp body 10. A ring-like engaging string 17a protrudes toward the inner side from the inner surface of the upright wall 17. The upright wall 17 is received by the U-shaped space defined by the inner part 35, the outer part 36 and the connection part 37 of the outer portion 34. In this state, the ring-like grooves 39 of the outer part 36 is brought into contact with the outer surface of the upright wall 17, and the engaging part 38 of the inner part 35 engages the engaging string 17a on the inner surface of the upright wall 17.

With this structure, the degree of connection of the inner portion 31 and the circumferential surface of the socket mounting portion 22 is improved due to the ring-like grooves 32, so that the waterproofing effect is improved. Additionally, the connection of the outer part 36 and the upright wall 17 is enhanced to further improve the waterproofing effect. The engagement of the engaging part 38 of the inner part 35 with the engaging string 17a secures the engagement in the outer portion 34, to thereby secure a further reliable waterproofing effect.

Figure 5:
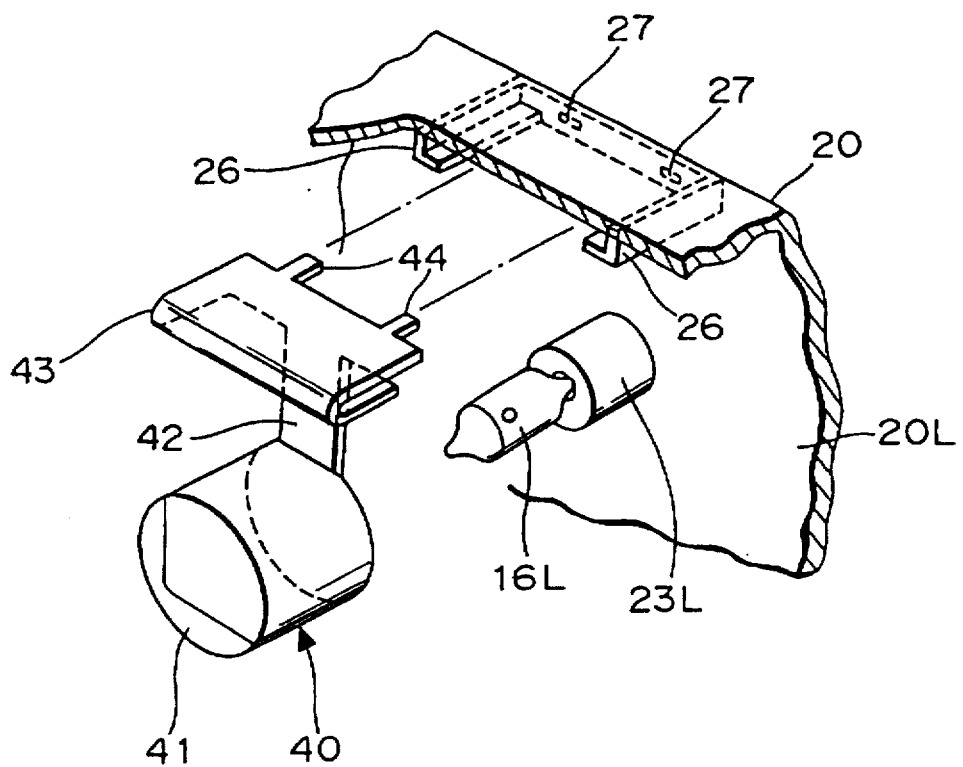
FIG. 5 is an exploded, perspective view showing a shade for the low beam lamp.

FIG. 5 is an exploded perspective view showing a shade for the low beam lamp LL of which the cross section is shown in FIG. 5. As shown in FIG. 5, a pair of rails 26, extending longitudinally, are mounted on a portion of the reflecting surface portion 20L of the reflector 20 located directly above the bulb 16L held thereby. The paired rails 26 are used for mounting a shade 40 on the reflecting surface portion 20L of the reflector 20. With the provision of the shade 40, the light emitted by the bulb 16L is prevented from being directly projected forward. The shade 40 is made of metallic material of high heat resistance. In the described embodiment, the shade 40 takes the form of a cap 41 which covers the front side of the bulb.

The cap 41 includes a narrow leg extending along the top thereof. A coupling part 43, continuous with the top of the leg 42, is expanded to a width corresponding to the distance between the paired rails 26. The coupling part 43 is a folded wide plate horizontally extending forwardly at a right angle to the narrow leg 42. The upper and lower sides of the folded wide plate are connected together at one end and opened at the other end. At the open end of the coupling part 43, a pair of extended parts 44 extend from the end of the upper side of the coupling part 43.

As shown in FIG. 3, the upper side of the coupling part 43 is inserted into the space between the rails 26. In this state, both sides of the coupling part 43 are vertically held by the reflector 20 and the rails 26. The extended parts 44 of the upper side of the coupling part 43 are inserted into slits 27 of the reflector 20. The extended parts 44 inserted into and protruding from the slits 27 are bent upward and to the rear side of the reflector 20 so that the extended parts 44 are fixed to the reflector 20. In this way, the shade 40 is fastened to the reflector 20.

The inner surface of the cap 41 is colored black to minimize the reflection of light therefrom. The surface of the shade 40 in area ranging from the cap 41 to the narrow leg 42 and the coupling part 43 is coated by aluminum by coating or vapor deposition process, as of the reflector 20. With the coating of aluminum, when viewing the inside of the headlamp, the shade 40 and the reflector 20 are seen in an integral form.

Heat generated when the bulb 16L is lit is radiated to the reflecting surface portion 20L of the reflector 20 located directly above the bulb. In the structure using the shade 40, the coupling part 43 of the metal shade, which is supported by the rails 26, is widely extended over this portion of the reflecting surface portion 20L. The coupling part 43 shuts off the direct radiation of the heat toward the reflector 20. The shut-off of heat by the coupling part 43 prevents the reflector 20 from being overheated. As a result, the heat resistance performance of the reflector is improved. The cap 41 is heated by the bulb 16L. The heat of the cap 41 is transmitted through the narrow leg 42 to the coupling part 43. Since the coupling part 43 is wide, that is, it has a large heat radiation area, the coupling part 43 efficiently radiates the received heat. The leg 42 is too narrow to block light emitted from the bulb 16L and reflected by the reflector 20.

Figure 6:
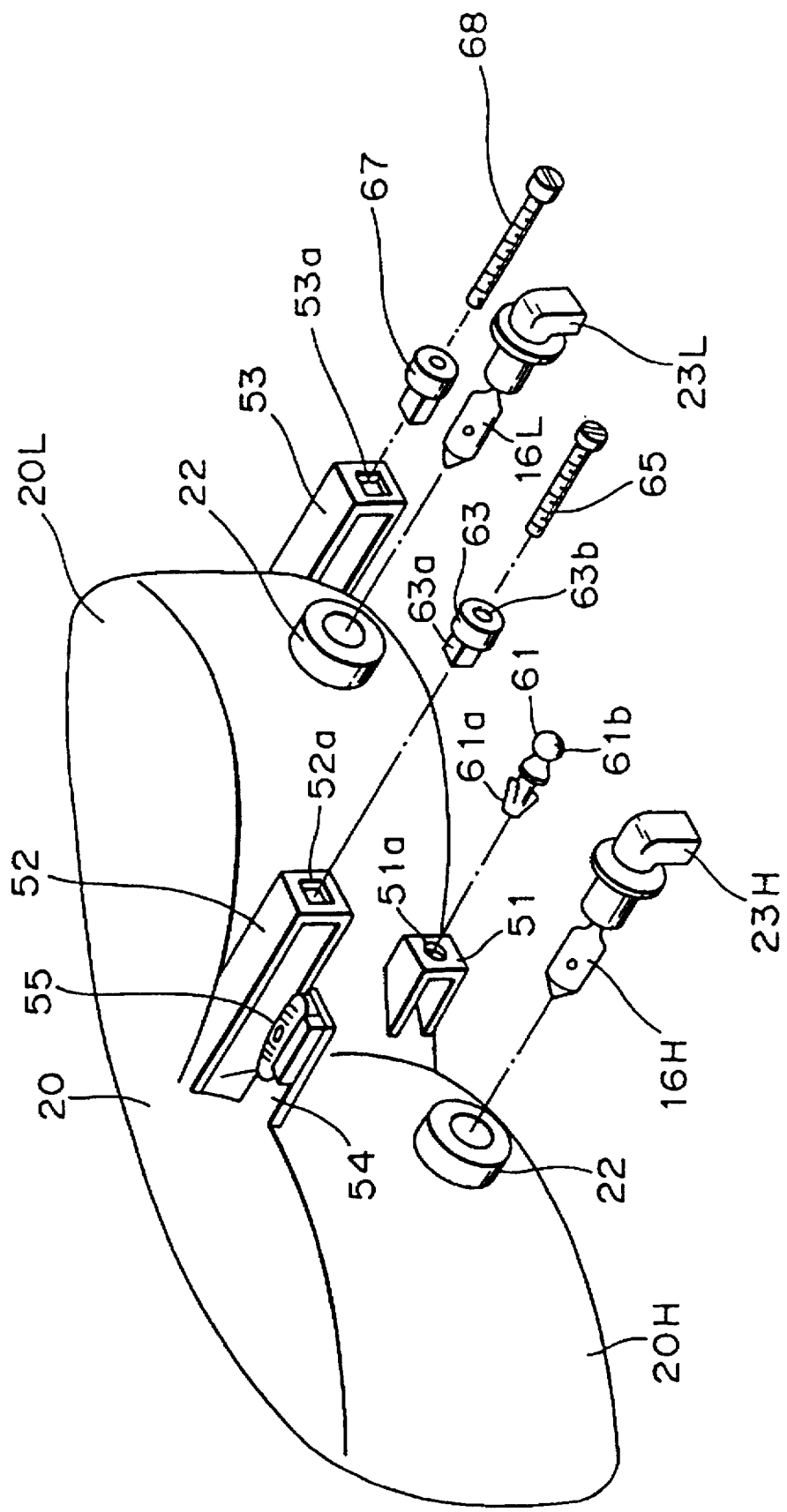
FIG. 6 is an exploded, perspective view showing a key portion of the rear side of a reflector.

Within the lamp body 10, the reflector 20 is vertically and horizontally tiltable so as to permit adjustment of the optical axes of the bulbs 16H and 16L mounted thereon. L-shaped brackets 50, 51 and 53, provided at three respective positions O, Y and X on the rear side of the reflector, extend rearward, as shown in FIG. 6 showing a configuration of the rear side of the reflector. The position O is located at the right lower corner, the position Y at the right upper corner, and the position X at the left lower corner when viewed from the front of the headlamp as shown in FIG. 1.

Figure 7A:
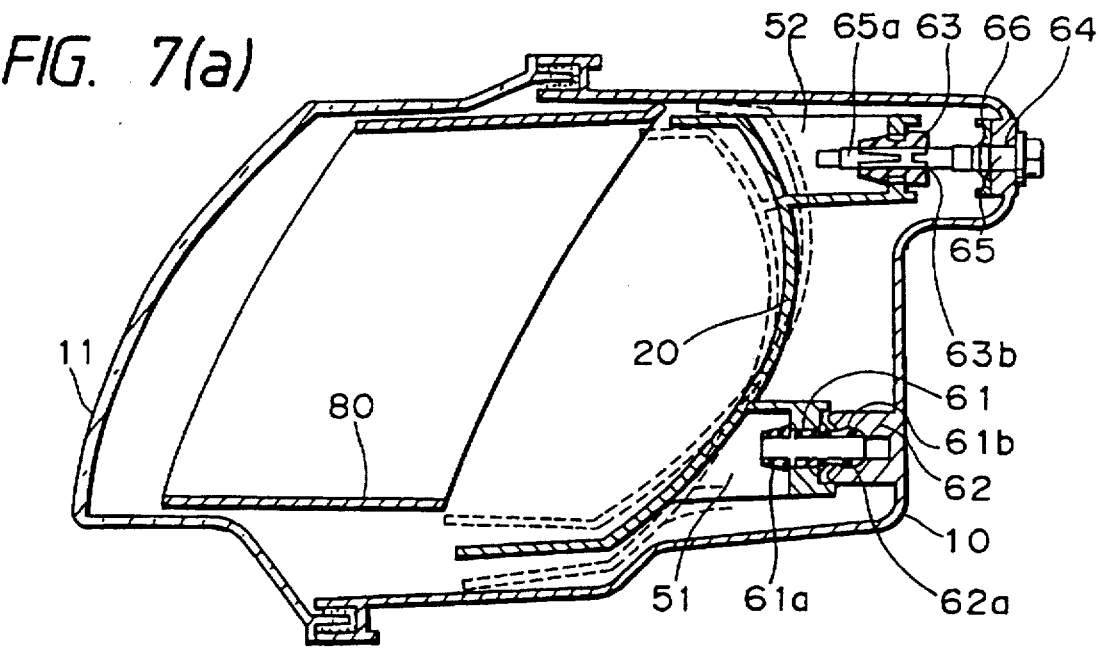
FIG. 7(a) is an enlarged cross-sectional view taken on line B—B in FIG. 1.

As also shown in FIG. 7(a), which is an enlarged cross-sectional view taken on line B—B in FIG. 1, the bracket 51 located at the right lower corner has a hole 51a formed in the base of the L-shaped bracket. The hole 51a receives a clip pin 61. The clip pin 61 includes a clip part 61a having a pair of radially deformable clip pieces at one end thereof, and a ball part 61b formed at the other end.

By inserting the clip part 61a of the clip pin 61 into the hole 51a of the bracket 51, the clip pieces of the clip part 61a are fitted to the inner edge of the hole 51a of the bracket 51, so that the clip pin 61 is fixed to the bracket 51. A pivot receiving portion 62 is integrally formed at a location on the inner surface of the lamp body 10 which corresponds to the clip pin 61.

The pivot receiving portion 62 has a spherical concavity 62a formed therein. The ball part 61b of the clip pin 61 is forcibly inserted into the spherical concavity 62a of the pivot receiving portion 62. The pivot receiving portion 62 includes a plural number of resilient pieces circumferentially arrayed therein. In inserting the ball part 61b of the clip pin 61 into the pivot receiving portion 62, the resilient pieces are radially deformed to allow the ball part 61b to enter the pivot receiving portion 62. With clip pin 61 inserted into the pivot receiving portion 62, the reflector 20 can be vertically and horizontally tilted with the ball part 61b as a fulcrum.

The bracket 52 located at the right upper corner has an hole 52a formed in the base of the L-shaped bracket. The hole 52a receives a clip nut 63. The clip nut 63 includes a clip part 63a having a pair of radially deformable clip pieces at one end thereof. The clip nut 63 includes a threaded hole formed therein, which serves as a female thread 63b. By inserting the clip part 63a of the clip nut 63 into the hole 52a of the bracket 52, the clip pieces are fitted to the inner edge of the hole, and the clip nut 63 is fixed to the bracket 52. A through-hole 64 is formed at a location on the rear side of the lamp body 10 which corresponds to the clip nut 63. A vertical aiming screw 65 is inserted into the through-hole 64 from the rear side.

The vertical aiming screw 65 is supported by the lamp body 10 in such a manner that it is axially rotatable but unremovable from the lamp body 10. In supporting the vertical aiming screw 65 by the lamp body 10, a snap washer 66, for example, is applied to the vertical aiming screw 65 inside the lamp body 10. A threaded part 65a of the vertical aiming screw 65 is screwed into the clip nut 63. With this structure, by turning the vertical aiming screw 65 from the rear side of the lamp body 10, the clip nut 63 and the bracket 52 screwed thereinto are moved in the axial direction of the vertical aiming screw 65, and the reflector 20 is vertically tilted about the clip pin 61 in the vertical plane so as to adjust the tilt angle in the vertical direction.

Figure 7B:
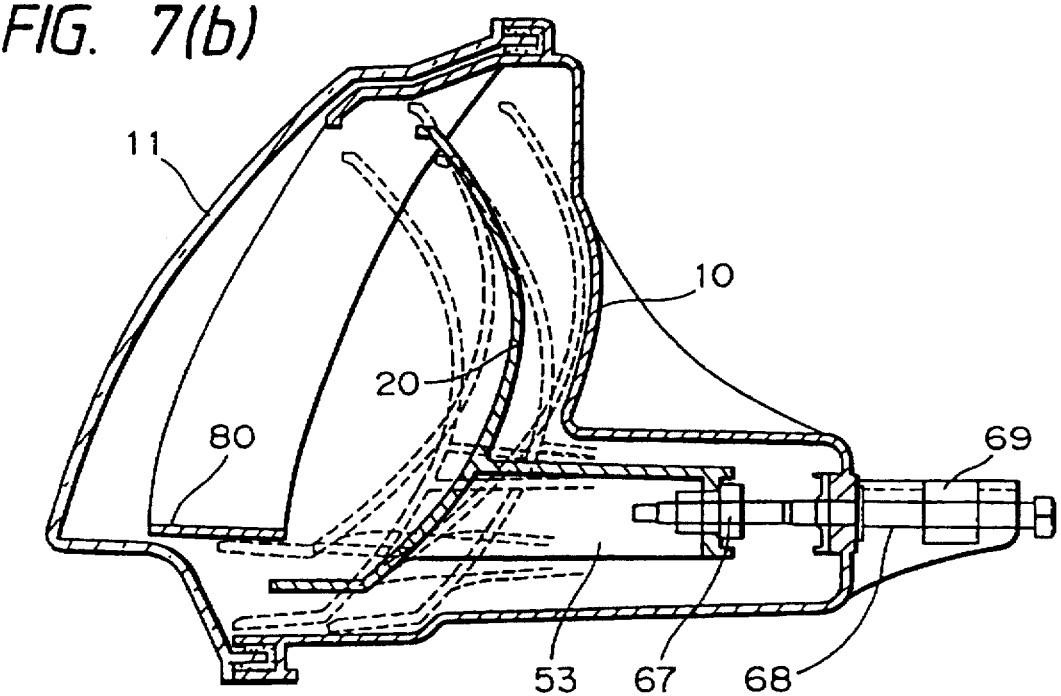
FIG. 7(b) is an enlarged cross-sectional view taken on line C—C in FIG. 1.

As also shown in FIG. 7(b) showing an enlarged cross-sectional view taken on line C—C in FIG. 1, the bracket 53 located at the left lower corner also includes a hole 53a. The hole 53a receives a clip nut 67. The construction of the clip nut 67 is the same as that of the clip nut 63. A horizontal aiming screw 68 is screwed into the clip nut 67. The horizontal aiming screw 68, like the vertical aiming screw 65, is axially rotatably supported on the lamp body 10 by means of a snap washer 66, for example. With this structure, by turning the horizontal aiming screw 68, the clip nut 67 and the bracket 53 screwed thereonto are moved in the axial direction of the horizontal aiming screw 68, and the reflector 20 is tilted about the clip pin 61 in the horizontal plane, thereby to adjust the tilt angle in the horizontal direction.

A scale plate 69 for visually checking the amount of movement of the horizontal aiming screw 68 is provided on the rear side of the lamp body 10, in connection with the horizontal aiming screw 68. One can thus visually check the reference position and amount of deviation of the reflector 20 from the reference position in the horizontal direction.

As shown in FIG. 6, a stem 54, located adjacent to the bracket 52, extends rearward from the reflector 20 along the optical axis of the reflector. A level vial 55 is mounted on the rear end part of the stem 54 by means of a holder and screws (not shown). The level vial 55 is a bubble tube of well-known construction consisting of an arcuate sealed glass tube marked with a scale, and which contains colored liquid. In the tube, a bubble moves along the scale depending on a tilt angle of the reflector 20 when it is vertically tilted. As shown in FIG. 8, showing an enlarged cross-sectional view taken on line D—D in FIG. 1, the lamp body 10 has a circular opening 10b. The circular opening 10b is located just about the level vial 55. The circular opening 10b is covered with a transparent cap 56. Through the transparent cap 56, one can see the scale of the level vial 55 from outside the lamp body 10.

Figure 9A:
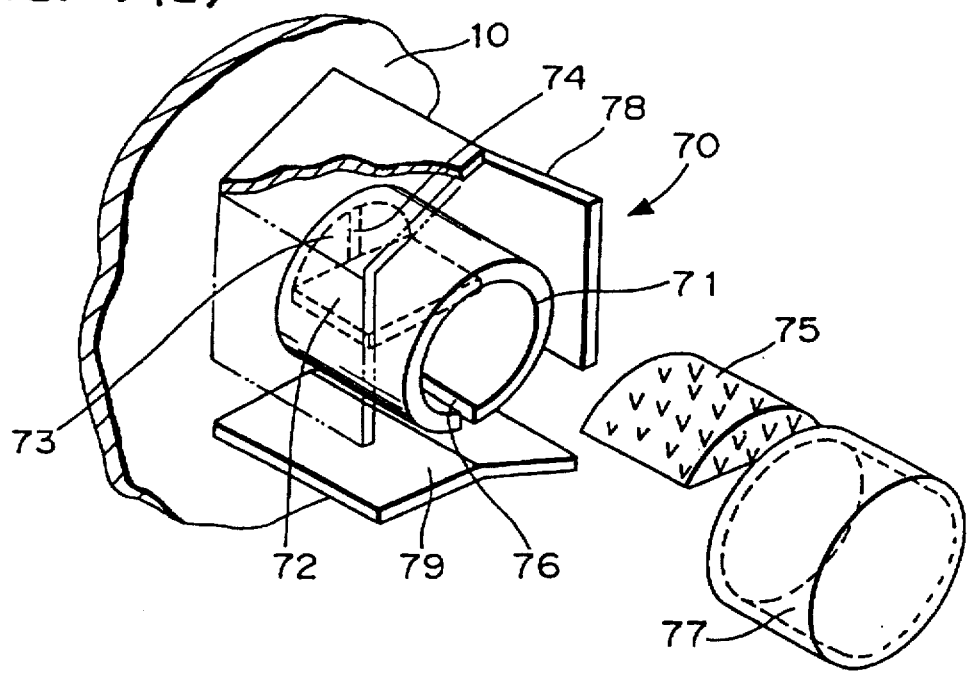
FIG. 9(a) is a perspective view showing a ventilation hole structure.
Figure 9B:
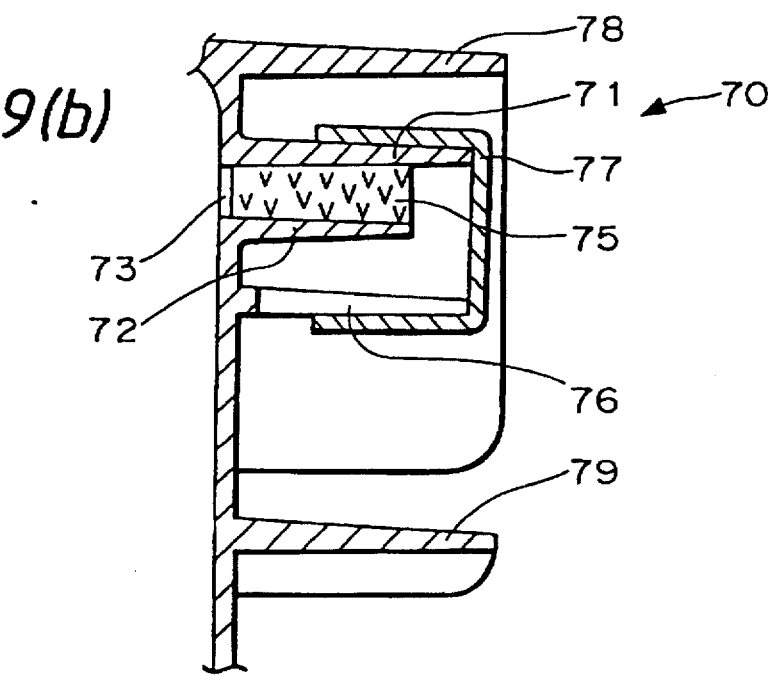
FIG. 9(b) is an enlarged cross-sectional view showing the ventilation hole structure.

A ventilation hole structure 70 is provided on the rear side of the lamp body 10. A perspective view of the ventilation hole structure 70 is shown in FIG. 9(a), and an enlarged cross-sectional view thereof is shown in FIG. 9(b). The ventilation hole structure 70 allows air to circulate from inside the lamp body 10 to the outside thereof and vice versa for ventilation.

The structure of the ventilation hole 70 will now be described. As shown, the ventilation hole structure 70 includes a tubular portion 71 directed rearward from the rear side of the lamp body 10. A partition plate 72, shorter than the tubular portion 71, horizontally partitions the inner space of the tubular portion 71 into upper and lower spaces, each semicircular in cross section. Within the semicircular upper space, a semicircular opening 73 is vertically segmented into two openings by a crosspiece 74. A filter 75 is placed in the upper space of the inner space of the tubular portion 71. The filter 75 filters out the contaminated air flowing through the opening 73 and the upper space. The filter 75 is made of synthetic resin fiber containing rubber particles. The filter 75 thus constructed absorbs contaminating particles contained in the gas exhausted from the engine to thereby block the flow of the contamination particles into the lamp body 10. The crosspiece 74 prevents the filter 75 from dropping into the lamp body 10 through the opening 73.

The bottom of the tubular portion 71, defining the lower space in cooperation with the partition plate 72, is longitudinally cut out to form a slit 76. The open end of the tubular portion 71 is covered with a tubular cap 77. With the cap, the partitioned inner space of the tubular portion 71 is kept from sight.

Above the tubular portion 71, an upper cover 78, extending from the rear side of the lamp body 10, is shaped like an inverted U. The upper cover 78 protects the tubular portion 71 against water droplets which might otherwise drop thereon. Under the tubular portion 71, an under cover 79 also extends from the rear side of the lamp body 10. The under cover 79 is provided for preventing water droplets from adhering to the tubular portion 71 or from entering the tubular portion 71 through the slit 76.

Provision of the ventilation hole structure 70 allows the lamp chamber to communicate with the outside. With this structure, no water droplets can enter the lamp chamber, and no condensation takes place within the lamp chamber.

Air flows through the semicircular opening 73, the filter 75, and the slit 76. The opening 73 and the slit 76 cooperate with the partition plate 72 to form a labyrinth structure. With this structure, entry of water into the lamp body 10 by way of the semicircular opening 73 is effectively blocked. Further, the filter 75 filters out contaminating particles to keep the inside of the lamp body 10 clean.

An extension reflector 80 is disposed within the lamp chamber 12 defined by the lamp body 10 and the lens 11. To form the extension reflector 80, resin is molded in a one-piece construction. The surface of the resultant structure is coated with aluminum by coating or a vapor deposition process. For this, reference is made to FIG. 10 showing a perspective view of the extension reflector 80. A mounting piece 81 protrudes from the lower surface of the extension reflector 80, and an engaging protruding piece 82 protrudes from the upper surface thereof. Within the lamp chamber 12 of the lamp body 10, the extension reflector 80 is fastened to the lens 11 in such a manner that the mounting piece 81 is secured to the lens 11 by means of a screw 83, and the engaging protruded piece 82 is firmly coupled with an engaging part 11b of the lens 11.

The extension reflector 80 is provided covering all the three lamp sections. The low and high beam lamp sections of the extension reflector 80 are formed as frames. These frame-like sections 80H and 80L of the extension reflector 80 are disposed between the reflector 20 and the lens 11 so as to conceal the inner surface, colored black, of the lamp body 10, which is exposed around the reflector 20. Otherwise, the black inner surface of the lamp body 10 is seen from the outside, through the lens 11. The shape, dimension and position of the extension reflector 80 are selected so as to allow the reflector 20 to be vertically and horizontally tilted by the aiming mechanisms without interference with the extension reflector 80.

A section 80S of the extension reflector 80 which corresponds to the side marker lamp SL serves as a reflector 84 for the side marker lamp SL, as shown in FIGS. 2 and 10. The reflector 84 includes a major portion 86 and a boundary portion 85. The reflector 84 of the extension reflector 80 is shaped so as to provide a predetermined light distribution characteristic of the side marker lamp SL. The boundary portion 85 of the reflector 84, separating the reflector 84 from the low beam lamp LL, extends upward to a level in proximity to the inner surface of the lens 11. The remaining portion or the major portion 86 of the reflector 84 extends along the inner surface of the lamp body 10. The major portion 86 of the reflector 84 has a bulb mounting hole 87 formed therein, which is aligned with the bulb insertion hole 15 of the lamp body 10. A bulb socket 23S is mounted in the bulb mounting hole 87 and the bulb insertion hole 15. For the mounting structure, the bulb mounting hole 87 takes the form of a bayonet hole (not illustrated). The bulb socket 23S is provided with a bayonet piece. Through the coupling of the bayonet piece of the bulb socket 23S with the bayonet hole of the bulb mounting hole 87, the bulb socket 23S is removably attached to the bulb mounting hole 87. The bulb socket 23S supports the bulb 16S in the side marker lamp section.

The headlamp of the combination type thus far discussed contains the three lamps HL, LL and SL. The combination headlamp, although it contains three lamps, may be constructed with only two reflector components, i.e., one reflector 20 common to the high beam lamp HL and the low beam lamp LL, and one extension reflector 80 which is common to the reflector for the side marker lamp SL and to the extension reflectors for the remaining lamps. When the reflector 84 for the side marker lamp SL is mounted on the lamp body 10, the extension reflector 80 is, of necessity, mounted on the lamp body 10. Accordingly, by subsequently assembling the reflector 20, which is common to the high and low beam lamps HL and LL, into the lamp body 10, the assembly of the reflectors 20 and 80 is completed. Thus, the assembly work is very simple.

Further, the molding processes of the reflector 84 and the extension reflector 80 and the coating of aluminum can be concurrently carried out. Accordingly, the number of manufacturing steps is reduced and an easy manufacturing is realized.

Figure 11A:
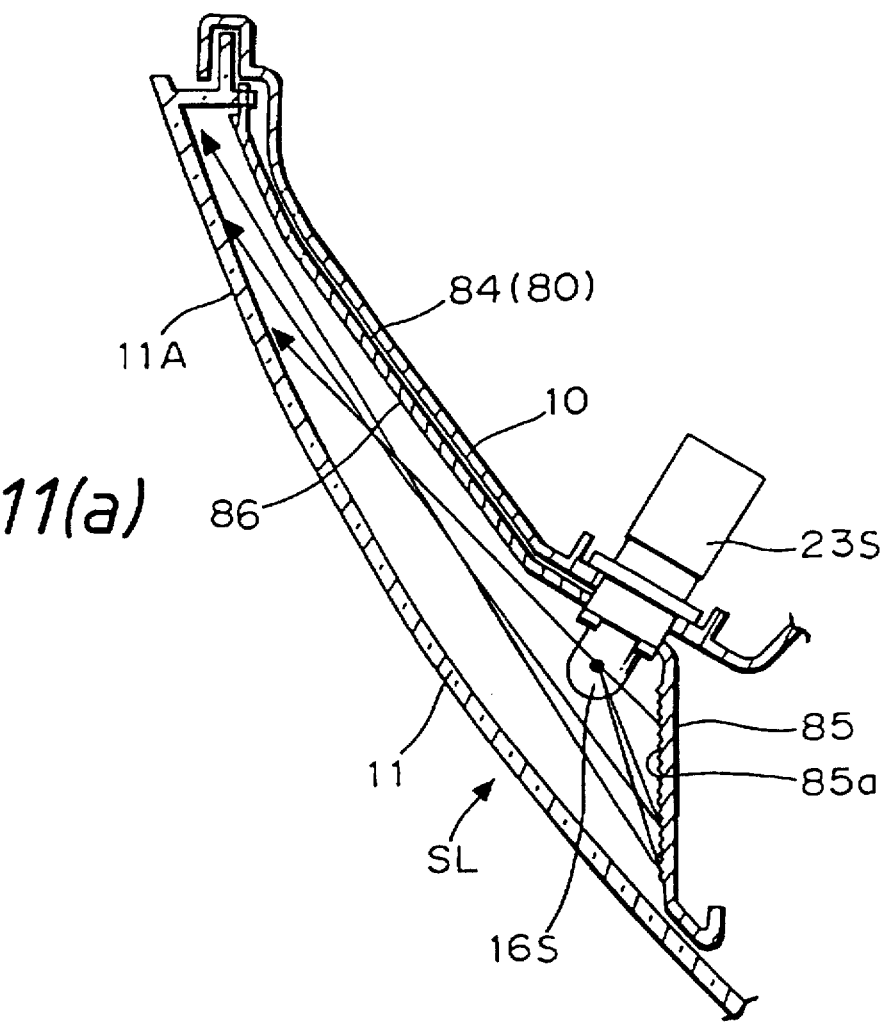
FIGS. 11(a) and 11(b) are diagrams useful in explaining the operation of a specific reflecting portion as a part of the reflector.
Figure 11B:
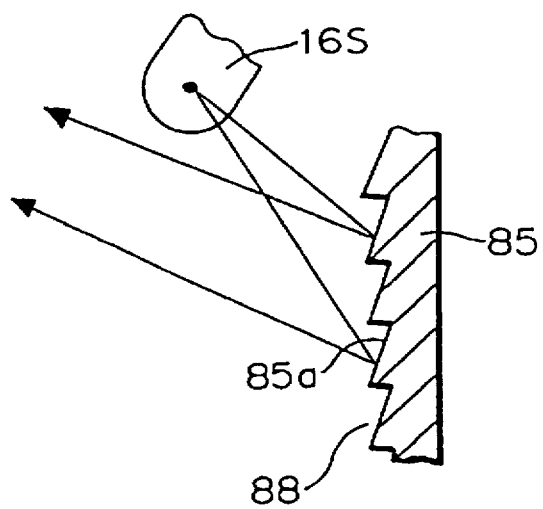
Figure 12:
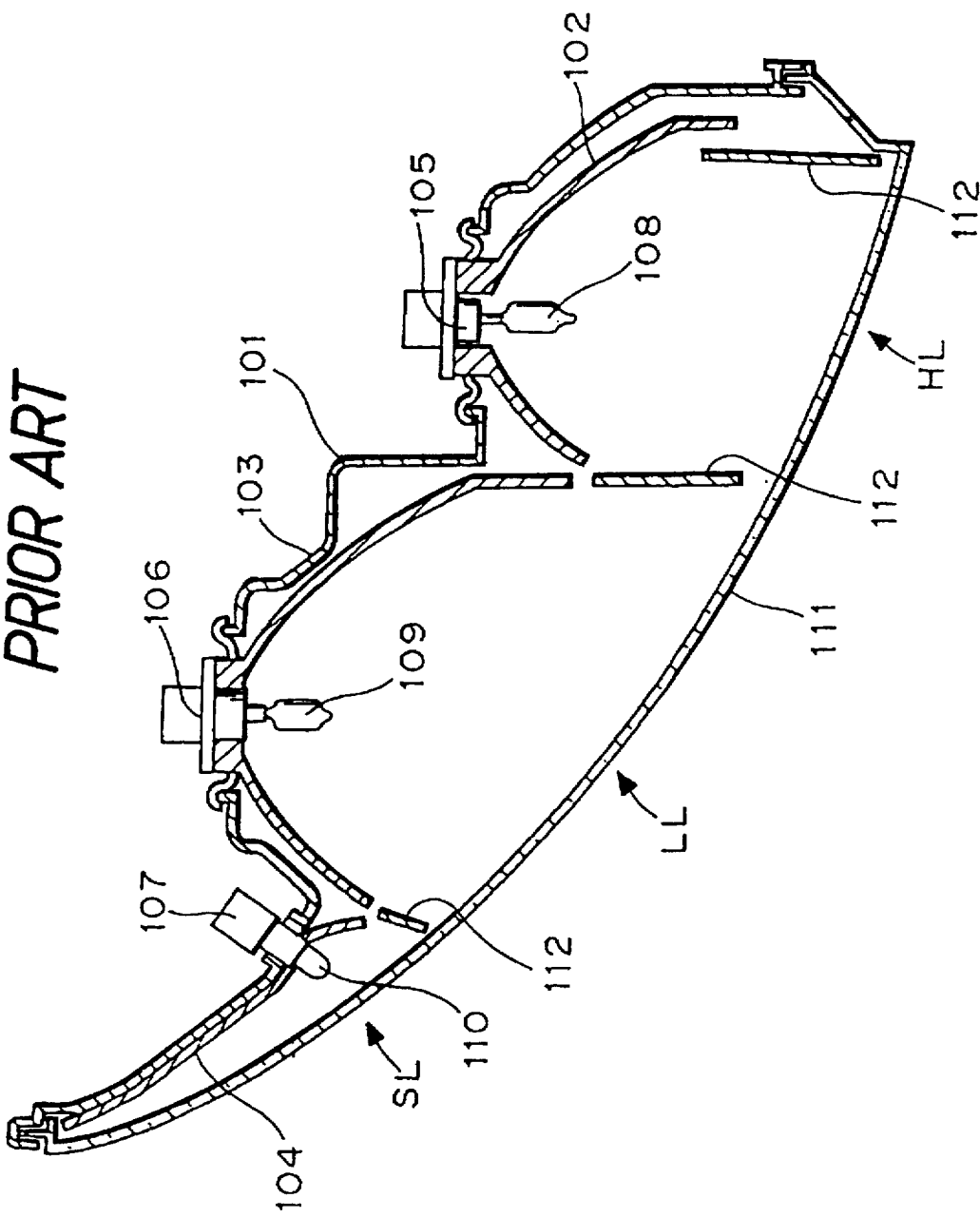
FIG. 12 is a transverse sectional view showing an example of a conventional combination lamp.

As shown in details in FIGS. 11(a) and 11(b), a number of protrusions, shaped like sawteeth in cross section, are formed in the inner surface of the boundary portion 85 as a part of the reflector 84 of the side marker lamp SL. These protrusions form a specific reflecting portion 88. Part of the light emitted by the bulb 16S is reflected by the specific reflecting portion 88 sideways, i.e., toward the lens area corresponding to the curved part 11A of the lens 11 which extends to the side of the vehicles's body. The mounting position of the bulb 16S and the configuration of the reflecting surface of the reflector 84 are designed so as to give the side marker lamp SL a light distribution characteristic such as to cover a range from the front of the vehicle body to the sides thereof. Therefore, the lens area 11A of the curved part is apart from the bulb 16S. In the case where the specific reflecting portion 88 is not used, reflected light from the reflector 84 is not actively directed to the curved part 11A.

With provision of the specific reflecting portion 88 of the reflector 84, when the bulb 16S is lit, part of the light emitted by the bulb 16S is directed, by the specific reflecting portion 88, sideways, i.e., toward the lens area 11A of the lens 11 located farther from the bulb 16S. Accordingly, the lens area 11A is heated by light energy so that its temperature rises, thereby preventing a greater temperature drop in the lens area 11A than in the lens areas of the other lenses. As a result, cooling of air in the lamp chamber in the lens area 11A of the curved part is prevented, as well as condensation of water on the surface of the lens, which could make the lens dim. Accordingly, the amount of light transmitted through the side marker lamp is not reduced by condensation on the lens, to thereby prevent deterioration of the light distribution characteristic while obtaining a good outward appearance.

The specific reflecting portion 88 may take shapes other than a sawtooth shape. Further, a reflecting plate may be attached to the reflector 84, although the specific reflecting portion 88 is integral with the reflector 84.

In the above-described embodiment, the present invention is applied to combination lamp composed of three lamps. It is evident though that the invention is applicable to other types of combination lamp, for example, a combination lamp in which a side marker lamp and a fog lamp are combined with a headlamp of the type in which a high beam is switched to a low beam and vice versa.

Such a construction that the specific reflecting portion 88 for directing light beams toward the specific lens area is formed as a part of the reflector may be applied not only for the combination lamp but also for other individual lamps, such as a side marker lamp.

As described above, the reflector for at least one lamp of those lamps contained in the vehicular lamp and the extension reflector are constructed with a single reflector body. At least one reflector may be handled as the same component as the extension reflector. This leads to a reduction of the number of component parts and the number of manufacturing steps. Further, the reflector and the extension reflector can be simultaneously manufactured as a single body. This feature also leads to a reduction of the number of manufacturing steps.

In the present invention, the reflector and the extension reflector, which are firmly mounted on the lamp body, are constructed as a single body. Accordingly, the tilt adjustment of the reflector is not hindered. The invention is generally applicable to a combination lamp with an aiming mechanism. With the invention, the number of required component parts is reduced and the manufacturing work is simplified.

In the invention, a specific reflecting portion for reflecting light beams of a bulb toward a specific lens area located apart from the bulb is formed as a part of the reflector. Light is directed to the lens area which receives a lesser amount of light. Moreover, the temperature difference between the specific lens area and other lens areas is reduced, thereby eliminating the condensation on the specific lens area. The problems of the adverse effects on the light distribution characteristic and the deterioration of the outward appearance of the lamp device are thus successfully solved.

In the lamp device constructed such that a part of the lens is curved and extends to the side of the car body, a lens area in the curved part is frequently spaced further apart from the bulb than the remaining lens area. In the present invention, the specific reflecting portion directs light beams to this lens area, thereby preventing condensation on this lens area.

What is claimed is:

1. In a vehicular lamp in which a plurality of lamps and reflectors for each of said lamps are provided in a lamp body, and a lens is mounted on an opening of the lamp body and in which said lamps include at least one front lamp and a side lamp for illuminating a side portion of the vehicle, a far-most side portion of said side lamp extending substantially rearwardly of a bulb for said side lamp, the improvement wherein a reflector associated with said side lamp includes a non-planar reflecting portion disposed forwardly of said lamp for reflecting light emitted from said bulb towards said far-most side portion to thereby illuminate said side portion of said vehicle and supply heat to an associated far-most side portion of said lens.

2. The vehicular lamp according to claim 1, wherein said reflecting portion includes a plurality of protrusions.

3. The vehicular lamp according to claim 2, wherein said protrusions have V-shape cross-section.

4. In a vehicular lamp in which a plurality of lamps and reflectors for each of said lamps are provided in a lamp body, and a lens is mounted on an opening of the lamp body and in which said lamps include at least one front lamp and a side lamp for illuminating a side portion of the vehicle, a far-most side portion of said side lamp extending substantially rearwardly of a bulb for said side lamp, the improvement wherein a reflector associated with said side lamp includes a non-planar reflecting portion for reflecting light emitted from said bulb towards said far-most side portion to thereby illuminate said side portion of said vehicle and supply heat to an associated far-most side portion of said lens, said reflecting portion comprises a plurality of v-shaped projections.

5. In a vehicular lamp in which a plurality of lamps and reflectors for each of said lamps are provided in a lamp body, and a lens is mounted on an opening of the lamp body and in which said lamps include at least one front lamp and a side lamp for illuminating a side portion of the vehicle, a far-most side portion of said side lamp extending substantially rearwardly of a bulb for said side lamp, the improvement wherein a reflector associated with said side lamp includes a non-planar reflecting portion for reflecting light emitted from said bulb towards said far-most side portion to thereby illuminate said side portion of said vehicle and supply heat to an associated far-most side portion of said lens, wherein said non-planar reflecting portion is disposed on an inside of said lamp and said far-most side portion is disposed on an outside of said lamp.

* * * * *